(12) United States Patent
Olaniyan

(10) Patent No.: US 8,694,343 B2
(45) Date of Patent: *Apr. 8, 2014

(54) METHOD AND SYSTEM FOR MANAGING APPEALS

(71) Applicant: Olakunle Olaniyan, Clarksville, MD (US)

(72) Inventor: Olakunle Olaniyan, Clarksville, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/016,166

(22) Filed: Sep. 2, 2013

(65) Prior Publication Data

US 2014/0006065 A1   Jan. 2, 2014

Related U.S. Application Data

(63) Continuation-in-part of application No. 13/760,010, filed on Feb. 5, 2013, now Pat. No. 8,533,009, which is a continuation-in-part of application No. 11/655,391, filed on Jan. 18, 2007, now Pat. No. 8,392,207.

(51) Int. Cl.
    G06Q 40/00    (2012.01)
    G06Q 10/00    (2012.01)
    G06Q 50/00    (2012.01)

(52) U.S. Cl.
    USPC ........................................ 705/4; 705/2; 705/3

(58) Field of Classification Search
    USPC .......................................................... 705/2–4
    See application file for complete search history.

(56) References Cited

U.S. PATENT DOCUMENTS

| | | | |
|---|---|---|---|
| 2001/0034621 A1* | 10/2001 | Kirsh et al. | 705/4 |
| 2003/0191665 A1* | 10/2003 | Fitzgerald et al. | 705/2 |
| 2004/0249665 A1* | 12/2004 | David | 705/2 |
| 2005/0060185 A1* | 3/2005 | Balogh | 705/2 |
| 2005/0137912 A1* | 6/2005 | Rao et al. | 705/4 |
| 2006/0041487 A1* | 2/2006 | Santalo et al. | 705/30 |
| 2006/0047561 A1* | 3/2006 | Bolton | 705/10 |

* cited by examiner

Primary Examiner — Joseph Burgess
(74) Attorney, Agent, or Firm — Im IP Law PLLC; C. Andrew Im

(57) ABSTRACT

A system and method for managing insurance claim denials. The system and method reviews a denial of claim from an insurer and a patient medical record received from a healthcare provider to determine if an appeal should be filed for the denial. It prepares an appeal to the denial comprising an appeals overturn letter and supporting document and submits the appeal to the insurer if it determines that an appeal should be filed. The system then tracks and monitors the progress of the appeal and process the appeal determination received from the insurer. The system utilizes these tracking and monitoring information to streamline and improve the insurance claim process of the healthcare provider, such as developing and implementing claim denial reduction program.

20 Claims, 9 Drawing Sheets

METHOD AND SYSTEM FOR MANAGING APPEALS

RELATED APPLICATION

The present application is a continuation-in-part application of U.S. application Ser. No. 13/760,010 filed Feb. 5, 2013, which is a continuation-in-part application of U.S. application Ser. No. 11/655,391 filed Jan. 18, 2007, each of which is incorporated by reference in its entirety.

BACKGROUND OF THE INVENTION

This invention relates to a method and system for managing appeals, more particularly, this invention relates to a method and system for managing managed care denials for healthcare providers.

With the advent of managed care, hospitals, physician practices, dental practices and other healthcare providers (collectively referred to herein as the "healthcare provider") often have payments for claims denied by health insurance companies for a variety of reasons. Generally, when a healthcare provider's claims are denied, the healthcare provider has the ability to appeal the denial to the health insurance company that issued the denial. Upon receipt of a written appeal or grievance, the insurance company or an insurance plan administer must review the appeal and make a decision regarding its approval or denial.

One example is medical insurance coverage plans. State and federal laws, as well as contractual provisions, allow both those insured (consumers) and healthcare providers (e.g., doctors, dentists, hospitals, physical therapists, medical clinics, etc.) the right to file appeals with the insurance companies when the insurer has denied a request or benefit. A consumer appeal arises when a request for approval to receive medical treatment is denied or a claim is not paid correctly. A healthcare provider may file an appeal on behalf itself or the patient when an insurer has not properly paid for a particular service rendered. Upon receipt of a written appeal, the insurer must review the appeal and make a decision regarding its approval or denial.

In a typical denial of a request for medical services, a patient and a healthcare provider determine the need for a medical service and the healthcare provider contacts the insurance company to request preauthorization for that service. After the healthcare provider has treated the patient, a claim for payment of those services is submitted to the patient's insurance company. The claim must be submitted on the appropriate claims submission form. Insurance companies require that a completed claim form be submitted with all of the requisite information, such as, patient's name and address, diagnosis, date of service, procedures or services provided utilizing standardized codes and descriptions (e.g., CPT codes), cost of service, etc.

If the claim does not meet the specified criteria of the insurer, the insurance company can deny or make only partial payment to the healthcare provider. The healthcare provider receives an explanation of payment outlining what was paid on the claim or the reasons why the claim was denied or partially paid. A description of the provider's right to appeal may be included in the correspondence from the insurance company. While the patient typically does not receive notification why a healthcare provider's request for payment for a medical service has been denied, she is often billed by the healthcare provider when the insurance company does not pay. In many instances, claims are denied because information is missing from the claim form or the insurance company has the wrong information about healthcare provider or patient.

The healthcare provider can appeal claim denial or payment reduction on behalf of the patient or itself. If the healthcare provider is appealing on behalf of a patient for a medical service request denial, the process is generally the same as an appeal lodged by the patient. For example, the healthcare provider can lodge an appeal when a confusing or incorrect explanation of benefit ("EOB") is received from the insurance company. An EOB is typically sent to the healthcare provider by the insurer explaining the payment(s) for submitted claims. The EOB is generally coded by the insurer's claims processing system and lists the reason(s) for the claims denial or partial payment. However, these EOB codes are not standardized in the healthcare industry.

Typically, the healthcare provider initiates an appeal by contacting the claims department of the appropriate insurance company. Generally, the healthcare provider has the right to appeal if and when: the appeal is on behalf of the patient for any reason; the insurer has denied the patient coverage for a service based on medical necessity; and a medical service claim payment has been denied, partially denied and/or paid incorrectly.

Patients generally submit a health insurance appeal for denial of a request for a medical service or claims payment. Once the patient and healthcare provider determine the need for a medical service, the healthcare provider contacts the insurer to request pre-authorization for that service. Upon receipt, the insurer initiates a pre-certification review to determine if the medical service request will be approved. The insurance company must send notification of any denial to the patient and the requesting healthcare provider and informs the patient that she has the right to appeal the decision. The insurer is required by law to outline the appeal process.

One of the most common reasons a medical service request is denied is because the insurer concludes that the medical service request is "not medically necessary." This typically occurs because the healthcare provider and/or patient has not provided all of the necessary information or the treatment provided does not meet the insurers guidelines. Most insurers utilize nationally recognized standards of medical care and criteria to guide their medical decision-making A medical director, who is a licensed physician, reviews all medical service request denials that are based on "medical necessity." When a patient or healthcare provider appeals a medical service request denial and provides additional or missing information, the majority of denials are overturned and the request for service approved.

Also, appeals can be triggered when patients receive a bill from their healthcare providers, who have not received reimbursement from the insurance company for services already provided. Typically, healthcare providers are not legally or contractually permitted to bill patients for more than the co-payment or deductible. However, often correspondence from a collection agency is the first notification for patients that the insurance company has denied their healthcare providers' service claim.

The appeal determination is made and the patient and/or healthcare provider is notified of the decision. If the denial is overturned, the patient is allowed to receive the requested service(s) and/or the healthcare provider is paid. If the appeal is upheld or affirmed, the patient and/or healthcare provider is then notified of the procedures for a secondary review. Typically, the third and final level of appeal includes external reviewers.

Many businesses or industries have regulated or contractual appeals or grievance process allowing a user or a customer the opportunity to challenge the denial of a service or benefit. However, these appeals or grievance processes uniformly suffer from lack of automation and standardization. Instead, the appeal or dispute is submitted in paper form and without the benefit of standardized nomenclature or data format. Accordingly, the claimed invention proceeds upon the desirability of providing an automated process for managing such appeals.

OBJECTS AND SUMMARY OF THE INVENTION

Hospitals and other healthcare providers typically have a high amount of receivables and lose a significant amount of money on non-collected or denied claims because of the administrative burden and expense of filing an appeal. Many healthcare providers are not familiar with the appropriate procedure for appealing a payment denial and simply resubmit the bill. Furthermore, many healthcare providers typically have a limited number of staff members for billing and appealing issues, and do not have sufficient resources for following up on these filed appeals.

Therefore, it is an object of the claimed invention to provide a method and system for managing the appeal process to reduce the number of claims denials for healthcare providers before they occur.

It is another object of the claimed invention to provide a method and system as aforesaid that assists healthcare providers in recovering unpaid claims by significantly increasing the success rate of appeals for denied claims. In accordance with an exemplary embodiment of the claimed invention, the method and system provides a staged approach for managing appeals.

In accordance with an exemplary embodiment of the claimed invention, a method and system processes and manages the healthcare or managed care denials for hospitals and other healthcare providers (hereinafter "healthcare provider"). The claimed invention allows an investigator to efficiently investigate and appeal a denial of an insurance claim, and ensure that approved appeals are timely paid to the healthcare provider by the insurer.

In accordance with an exemplary embodiment of the claimed invention, the method and system develops a customized denial reduction program for healthcare providers on an individual basis based on the healthcare provider's appeal process and records, thereby reducing the number of denials received and minimizing the appeals burden on the healthcare provider.

Upon receiving denial notification and information transfer, in accordance with an exemplary embodiment of the claimed invention, an appeals coordinator can utilize the inventive system to evaluate the denial and associated information. The inventive system and method provides a recommendation to the appeals coordinator whether to pursue an appeal. If a decision is made to pursue the appeal, the inventive system generates and electronically transmits an appeal overturn letter, a completed appeal form and supporting documents to the insurer. The supporting documents can include medical records, financial information and call tracking information. The inventive system has tools to enable the appeals coordinator to monitor the appeal process to ensure timely processing and completion of the appeal. Subsequent action is then determined by the inventive system based on the appeals decision matrix. Different steps can be employed by the inventive system depending on the outcome of the appeal, i.e., denied, partially denied, or approved.

In accordance with an exemplary embodiment of the claimed invention, the system for managing appeals and denials comprises a database. The database comprises a primary data entry portal, data selection tool, activity tracking tool, report generation and analysis tool, maintenance tool and data warehouse.

In accordance with an exemplary embodiment of the claimed invention, the method for managing insurance claim denials comprises the steps of reviewing a denial of claim from an insurer and a patient medical record received from a healthcare provider to determine if an appeal should be filed for the denial; preparing an appeal to the denial comprising an appeals overturn letter and supporting document; electronically submitting the appeal to the insurer; monitoring the progress of the appeal; and processing appeal determination received from the insurer.

In accordance with an exemplary embodiment of the claimed invention, the system for managing insurance claim denials comprises a nurse review module, an appeals coordinating module, a managed cared organization (MCO) process management module and an appeal decision matrix module. The nurse review module reviews a denial of claim from an insurer and a patient medical record received from a healthcare provider to determine if an appeal should be filed for the denial, and prepares an appeal to the denial comprising an appeals overturn letter and supporting document. The appeals coordinating module for electronically submitting the appeal to the insurer. The MCO process management module monitors the progress of the appeal. The appeal decision matrix module processes appeal determination electronically received from the insurer.

In accordance with an exemplary embodiment of the claimed invention, the computer readable medium comprises code for managing insurance claim denials. The code comprises instructions for reviewing a denial of claim from an insurer and a patient medical record received from a healthcare provider to determine if an appeal should be filed for the denial; preparing an appeal to the denial comprising an appeals overturn letter and supporting document; electronically submitting the appeal to the insurer; monitoring the progress of the appeal; and processing appeal determination electronically received from the insurer.

In accordance with an exemplary embodiment of the claimed invention, a web-based method for managing insurance claim denials for a plurality of healthcare providers comprises comparing a claim denial of a healthcare provider to a denial status grid comprising a list of denial types and an appeal success rate for each denial type on the list by a review module of a server. The review module provides a recommendation to proceed with or to decline to proceed with an appeal of the claim denial based on the comparison and a patient record associated with the claim denial. The method further comprises the steps of determining to proceed with the appeal of the claim denial is based on the recommendation; preparing an appeals package comprising an appeals overturn letter and a supporting document in support of the appeal to the claim denial by the nurse review module of the server; and electronically submitting the appeals package to an insurer associated with the claim denial by an appeals coordinating module of the server over the communications network to file the appeal of the claim denial. The process management module of the server monitors the progress of the appeal filed with the insurer by a process management module of the server. The appeals decision matrix module of the server processes an appeal determination electronically received from the insurer, and determines whether to file a second level appeal when the appeal is denied or partially denied.

In accordance with an exemplary embodiment of the claimed invention, a web-based computer system for managing insurance claim denials over a communications network comprises a hardware server for managing claimed denials for a plurality of healthcare providers, a database and a plurality of processor based client devices. The hardware server comprises a review module, an appeals coordinating module, a managed care organization (MCO) process management module and an appeal decision matrix module. The review module compares a claim denial of a healthcare provider to a denial status grid comprising a list of denial types and an appeal success rate for each denial type on the list, provides a recommendation to proceed with or to decline with an appeal of the claim denial based on the comparison and a patient record associated with the claim denial. The review module A determination to proceed with the appeal of the claim denial is based on the recommendation. The review module prepares an appeals package comprising an appeals overturn letter and a supporting document in support of the appeal to the claim denial. The appeals coordinating module electronically submits the appeals package to an insurer associated with the claim denial over the communications network to file the appeal of the claim denial. The MCO process management module monitors the progress of the appeal filed with the insurer. The appeal decision matrix module processes appeal determination electronically received from the insurer and determines whether to file a second level appeal when the appeal is denied or partially denied. The database for storing the claim denial, the patient medical record, the appeals package and the appeal determination. The processor based client devices for accessing the server over the communications network. Each client device associated with a health care provider.

In accordance with an exemplary embodiment of the claimed invention, a non-transitory computer readable medium comprises computer executable code for managing insurance claim denials for a plurality of healthcare providers. The computer executable code comprises instructions for comparing a claim denial of a healthcare provider to a denial status grid comprising a list of denial types and an appeal success rate for each denial type on the list by a review module of a processor-based server. The review module provides a recommendation to proceed with or to decline to proceed with an appeal of the claim denial based on the comparison and a patient record associated with the claim denial. The review module prepares an appeals package comprising an appeals overturn letter and a supporting document in support of the appeal to the claim denial when a determination is made to proceed with the appeal of the claim denial. The appeals coordinating module of the server electronically submits the appeals package to an insurer associated with the claim denial over a communications network to file the appeal to the claim denial. The process management module of the server monitors the progress of the appeal filed with the insurer. The appeals decision matrix module of the server processes an appeal determination electronically received from the insurer and determines whether to file a second level appeal when the appeal is denied or partially denied.

In accordance with an exemplary embodiment of the claimed invention, the aforesaid process management module electronically transmits a reminder notification to a processor-based device of the insurer associated with the appeal over the communications network for the appeal determination not received within a predetermined interval from the insurer. Also, the aforesaid process management module electronically transmits a delivery confirmation of the reminder notification to a processor-based device of the healthcare provider associated with the appeal over the communications network.

In accordance with an exemplary embodiment of the claimed invention, the aforesaid process management module adjusts the predetermined interval associated with the appeal in response to an input from the healthcare provider associated with the appeal.

In accordance with an exemplary embodiment of the claimed invention, the aforesaid process management module adjusts the predetermined interval associated with the appeal based on the requirements of the insurer associated with the appeal.

In accordance with an exemplary embodiment of the claimed invention, the aforesaid appeals decision matrix module determines a number of levels of appeal to file based on the insurer associated with the appeal when the appeal is denied or partially denied.

In accordance with an exemplary embodiment of the claimed invention, aforesaid system and method, further comprises a claims payment management module for electronically transmitting a reminder notification to a processor-based device of the insurer associated with an approved appeal over the communications network for the approved appeal not paid by the insurer within a predetermined interval, and electronically transmitting a delivery confirmation of the reminder notification to a processor-based device of the healthcare provider associated with the approved appeal over the communications network.

In accordance with an exemplary embodiment of the claimed invention, aforesaid system and method, further comprises a process feedback and improvement module for generating a process report for each insurer or each healthcare provider to assist in monitoring the efficiency of the appeal process.

Various other objects of the claimed invention will become readily apparent from the ensuing detailed description and from the accompanying figures.

BRIEF DESCRIPTION OF THE FIGURES

The following detailed description, given by way of example, and not intended to limit the claimed invention solely thereto, will best be understood in conjunction with the accompanying drawings in which like components or features in the various figures are represent by like reference numbers:

DETAILED DESCRIPTION OF THE EMBODIMENTS

With reference to the figures, exemplary embodiments of the invention are now described. These exemplary embodiments illustrate principles of the invention and should not be construed as limiting the scope of the invention.

The term "healthcare providers" as used herein includes but is not limited to hospitals, doctors, dentists, medical clinics, dental clinics, physical therapists and other healthcare providers.

A denial notification is the process whereby the healthcare provider receives notification of a denied claim from the insurer. Most state insurance regulations require that the denial notification be in writing. Information transfer is the process by which denial notification is received along with other information in the healthcare provider's possession, such as patient's medical records, that are necessary for a successful appeal.

Figure 9:
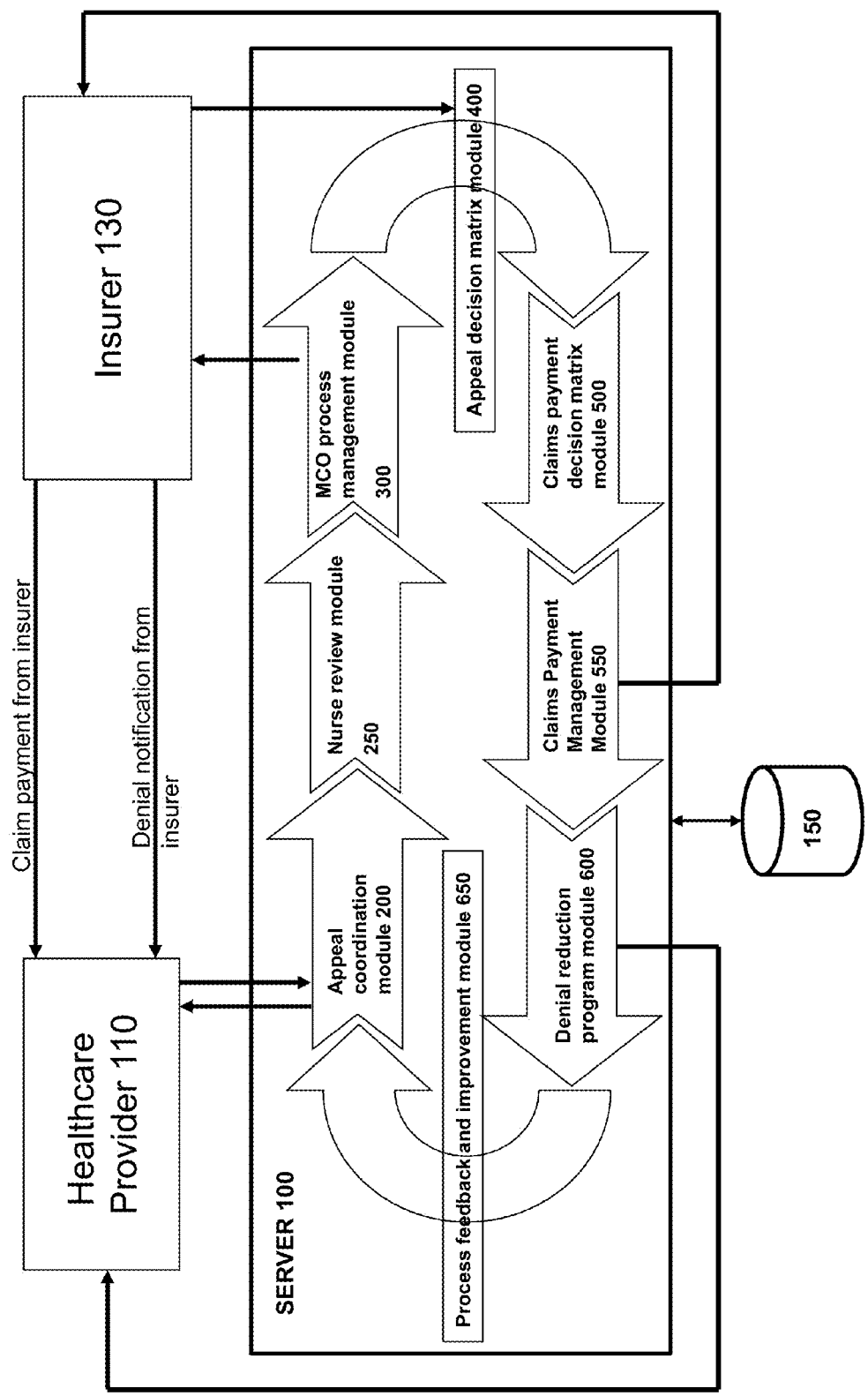
FIG. 9 illustrates a schematic diagram of the system in accordance with an exemplary embodiment of the claimed invention.

As exemplary shown in FIG. 9, the processor based server 100 implementing the claimed system and method is connected to one or more processor based client devices 110 (e.g., personal computers, laptops, tablets, smart phones, servers and the like) associated with one or more healthcare providers, and one or more processor based devices or servers 130 (e.g., computers, laptops, tablets, smart phones, servers and the like) associated with one or more insurers over a communications network, e.g., Internet. In accordance with an embodiment of the claimed invention, as shown in FIG. 9, the server 100 comprises an appeals coordinating module 200, a nurse review module 250, a MCO process management module 300, an appeals decision matrix module 400, a claims payment decision matrix module 500, a claims payment management module 520, a denial reduction program module 600 and a process feedback and improvement module 650. Preferably, in accordance with an exemplary embodiment of the claimed invention, the system and method provides web-based computer system and method for managing insurance claim denials for a plurality of healthcare providers.

In accordance with an exemplary embodiment of the claimed invention, as shown in FIG. 9, the system comprises a database 150 comprising a primary data entry portal, data selection tool, activity tracking tool, report generation and analysis tool, maintenance tool and data warehouse. The data entry tool of the primary data entry portal in accordance with an exemplary embodiment of the claimed invention can collect these type of information: names, unique identifiers, healthcare provider's name, facility names, diagnosis code, claim amount, denied amount, units/days denied, denial letter date, healthcare provider denial receipt date, system denial receipt date, system denial mail date, admission date, discharge date, regulatory compliance met, denial type, bed type (intermediate care unit (ICU), critical care unit (CCU), medical/surgery (medsurg)), amount overturned and days/unit overturned.

In accordance with an exemplary embodiment of the claimed invention, the activity tracking tool can collect activity tracking data such as, activity type (appeals activity, claims activity), activity subtype (level one appeal), actual event (denial mailed, Managed Cared Organization (MCO) called, etc.) and outcome tracking (approved, upheld, partial, etc.).

The report generation and analysis tool has the following exemplary capabilities for managerial reports: all appeals, appeals by MCO, hospital, physician, diagnosis or another combination of previously collected data, all open appeals, all closed appeals, all upheld appeals, all overturned appeals, all open appeals no response and all approved not paid.

In accordance with an exemplary embodiment of the claimed invention, information reports can be used to analyze long term trends and develop initiatives to improve the appeals process, such as, denial types by MCO, physician denials by diagnosis, MCO denial by diagnosis and timeliness data.

In accordance with an embodiment of the claimed invention, information reports can be generated for clients to update them on the status of their denials. These report can include information on the status of each appeal or appeals in aggregate, such as, all appeals status (mailed, responded, approved, partial, denied, paid), aggregate appeals status by payor, aggregate approvals and partials and aggregate denial upheld.

Actionable reports can be used to develop plans for clients to reduce denials. In accordance with an exemplary embodiment of the claimed invention, these actionable reports can include the following: denials by healthcare provider or physician, denials by insurer, denials by diagnosis, denials by denial type and insurer overturn activity.

In accordance with an exemplary embodiment of the claimed invention, the maintenance tool is used to maintain the database and change the components of the database that are visible to the user and data warehouse is a repository where the data components are stored.

Figure 1:
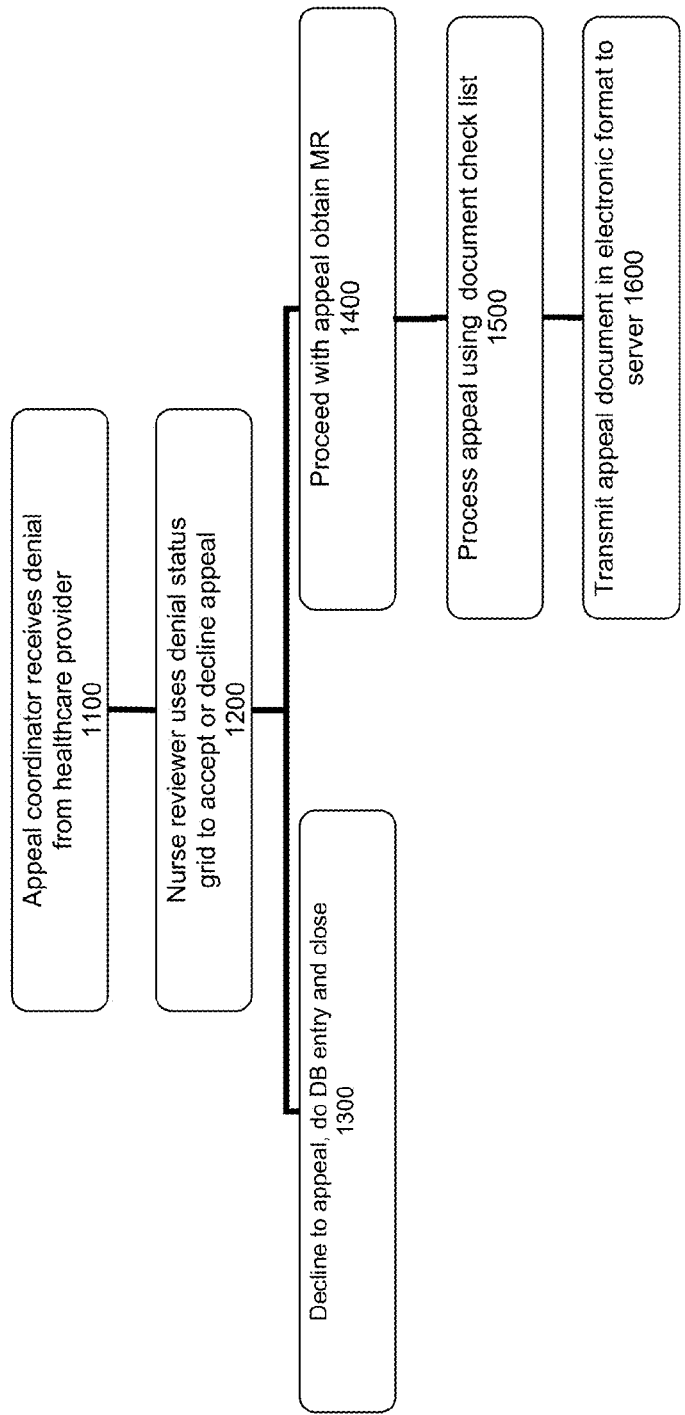
FIG. 1 illustrates the denial notification and information transfer process in accordance with an exemplary embodiment of the claimed invention.

In accordance with an exemplary embodiment of the claimed invention, the denial notification and information transfer process is now described in conjunction with FIG. 1. Once the healthcare provider receives a denial notification from the insurer, the client device 110 associated with the healthcare provider (or hereinafter the healthcare provider 110) sends a copy of the denial notification to an appeals coordinating module 200 so it can be reviewed by the appeals coordinator at step 1100. Preferably, the healthcare provider 110 also sends patient's medical records to the appeals coordinating module 200. The appeals coordinator can instruct the appeals coordinating module 200 to send a message or alert a nurse reviewer to conduct an initial review of the received denial notification. Additionally, the appeals coordinating module 200 sends electronic copies of the denial notification and the patient's medical record to a nurse review module 250. Alternatively, in accordance with an exemplary embodiment of the claimed invention, the health care provider can outsource the appeal process to a third-party service provider such that the denial notifications from the insurer can be sent directly to the third party service provider. In such an embodiment, the healthcare provider 110 can access the third party's server 100 over the communications network to monitor the status of the claim denial.

The nurse reviewer utilizes the nurse review module 250 to review and compare the denial notification and the medical records to a denial status grid at step 1200. In accordance with an exemplary embodiment of the claimed invention, the denial status grid comprises a list of denial types and the appeals success rates associated with these denial types. Based on the comparison, the nurse review module 250 provides a recommendation to the nurse reviewer whether to proceed with the appeal process or to decline the appeal. The nurse reviewer can make her decision to proceed with the appeals process based on the recommendation of the nurse review module 250 or can independently make her decision ignoring the nurse review module's recommendation.

If a decision is made to decline the appeal at step 1200, all the available information is entered into a database at step 1300 and no further work is done on that particular appeal.

However, if a decision is made to continue with the appeal at step 1200, the healthcare provider 110 is contacted and medical records are obtained, preferably electronically or in electronic format, at step 1400. Appeals coordinator utilizes the appeals coordinating module 200 to process the medical records and other documentation to ensure all needed documentation is claimed and arranged in a logical and orderly fashion using documentation check list template at step 1500. Once the documentation has been appropriately processed and organized, appeals are prioritized based on completion time frame, and primary demographic data is entered into the database. Appeals documentation and medical records are then scanned onto or preferably, transmitted electronically to the server 100 and stored in the database 150 at step 1600. Also, the appeals coordinating module 200 notifies a head nurse reviewer of the assignments, preferably by phone or email, at step 1600.

Figure 2:
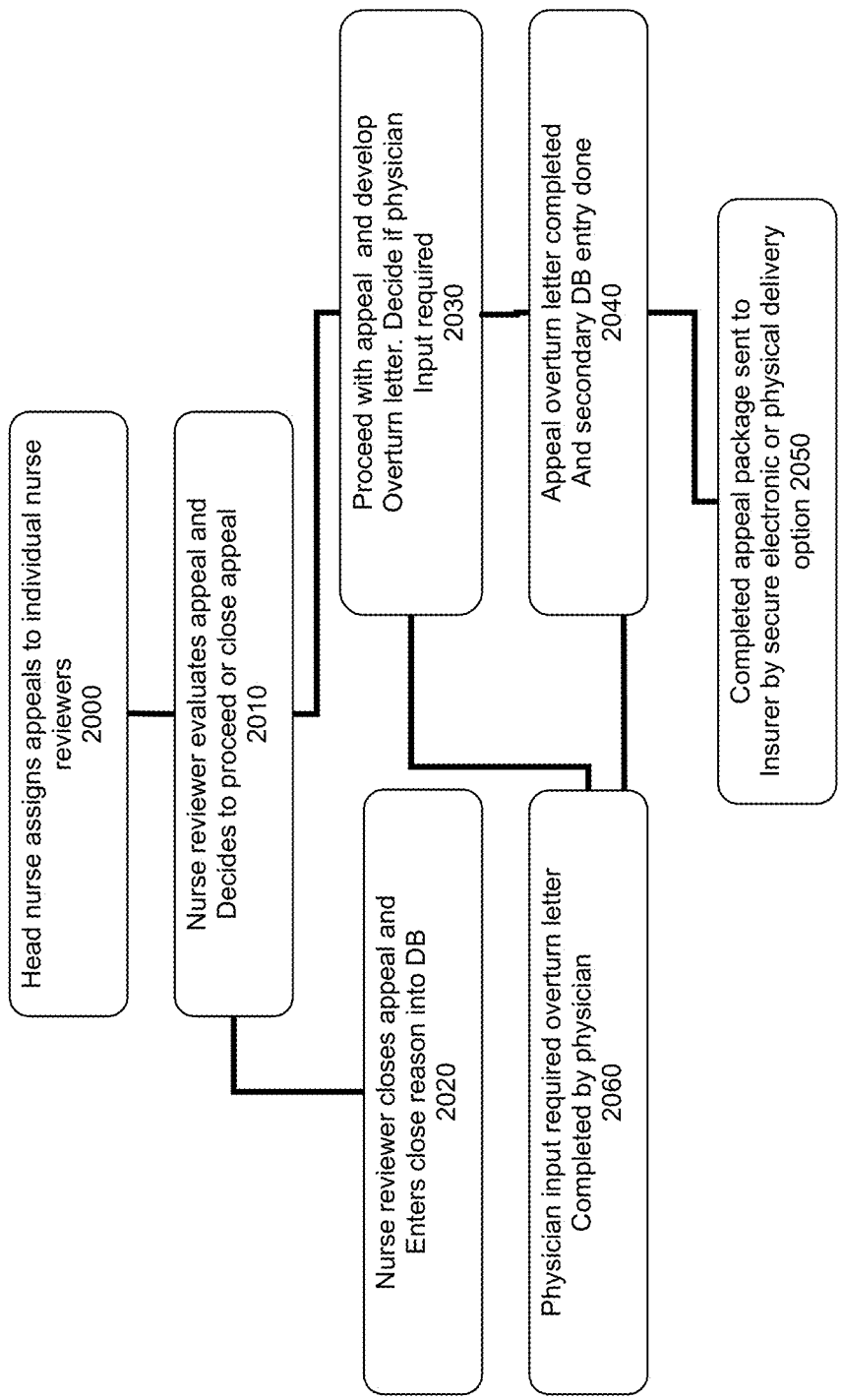
FIG. 2 illustrates the appeals processing and submission process in accordance with an exemplary embodiment of the claimed invention.

In accordance with an exemplary embodiment of the claimed invention, the appeals processing and submission process is now described in conjunction with FIG. 2. The inventive system generates the necessary documents for an appeal the information received from the healthcare provider 110. Typically, the appeals documents comprises a letter stating why the healthcare provider should be paid and supporting documents, such as medical records, financial information, call tracking information, etc. The head nurse reviewer using the nurse review module 250 assigns a nurse reviewer to each individual appeal based on the nurse reviewer's area of expertise and prior experience at step 2000.

The nurse reviewer in conjunction with the nurse review module 250 evaluates the medical records and all other available information at step 2010. Based on the review and the recommendation of the nurse review module 250, the nurse reviewer makes a decision to continue with the appeal or end the appeals process at step 2010. If nurse reviewer decides to end the process, the nurse review module 250 stores any additional information, including the specific reason for ending the appeal into the database 150 at step 2020 and closes out the appeal. However, if nurse reviewer decides to continue the appeal, the nurse review module 250 and/or the nurse reviewer develops an appeal overturn letter at step 2030. Additionally, the nurse review module 250 and/or the nurse reviewer determines whether a physician input is required to conduct additional research to support the denial overturn argument at step 2030. If the inquiry of step 2030 is answered in the negative at step 2030 (that is, a physician input is not required), the nurse review module 250 completes the appeal and enters the information into the database 150 at step 2040.

However, if the inquiry of step 2030 is answered in the affirmative (that is a physician input is required), the nurse review module 250 indicates that a specific research needed in appeal overturn letter. The nurse review module 250 assigns the appeal to a physician review folder and notifies the head reviewer requesting a physician review. Before the appeal is assigned to a physician for her input, a second nurse reviewer reviews the appeal and its corresponding supporting document. The second nurse reviewer either completes the appeal document or confirms the need for physician review and obtains a physician's input at step 2060. Once the appeal is completed, the nurse reviewer makes a secondary entry in the database 150 at step 2040. Appeal specific information, including the appeal type, physician name, diagnosis, admission and discharge date, appeals completion date are all entered into the database 150.

The nurse review module 250 sends the completed appeal package, including the appeal overturn letter, to the appeals coordinating module 200 so it can be reviewed by the appeals coordinator. At the instruction of the appeals coordinator, the appeals coordinating module 200 submits the completed appeal package to the insurer 130 via a secure delivery system with delivery confirmation at step 2050. Preferably, the appeals coordinating module 200 submits the completed appeal package to the insurer 130 via a secure electronic delivery over the communications network at sep 2050. Also, the appeals coordinating module 200 transmits an electronic notification and proof of submission or delivery of the appeal (i.e., the completed appeal package) to the healthcare provider 110 over the communications network. The date of delivery or transmission to insurer 130 is tracked and stored in the database 150. If a confirmation of receipt of the appeal package from the insurer 130 is not received within a predetermined time period, the appeals coordinating module 200 electronically resubmits the completed appeal package to the insurer 130 over the communications network.

Figure 3:
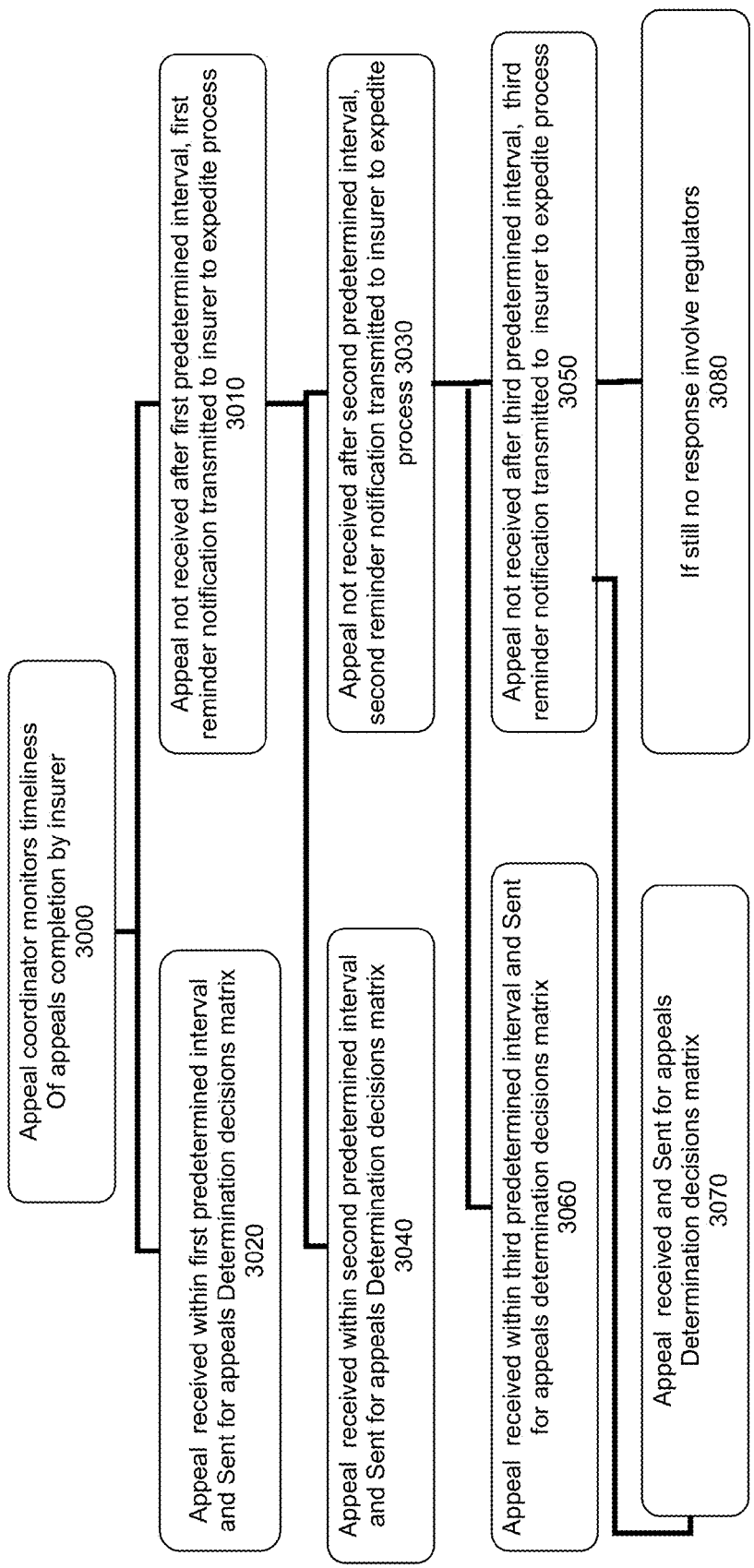
FIG. 3 illustrates the process for managing insurer's appeals in accordance with an exemplary embodiment of the claimed invention.

In accordance with an exemplary embodiment of the claimed invention, the process for managing the appeal process with the insurer 130 is now described in conjunction with FIG. 3. The MCO process management module 300 monitors the timeliness and completion of each appeal by using the activity tracking system of the database 150 at step 3000. The MCO process management module 300 can identify any appeals that have been with the insurer 130 for longer than a first predetermined interval or number of days, e.g., 45 days, and transmits a first reminder notification to the insurer 130 regarding any such delayed appeal over the communications network at step 3010. Each time a first reminder notification is sent to the insurer 130, the MCO process management module 300 notifies and provides a delivery confirmation of the first reminder notification to the healthcare provider 130 associated with the delayed appeal over the communications network at step 3010. In addition or alternatively, the MCO process management module 300 notifies the appeal coordinator of any such delayed appeal and the appeals coordinator can call the appeals customer service line of the insurer 130 to expedite the completion of such delayed appeals at step 3010. The MCO process management module 300 sends any response to an appeal received within the first predetermined interval to the appeals decision matrix module 400 at step 3020.

Additionally, the MCO process management module 300 uses the activity tracking system of the database to identify any appeals that have been with the insurer 130 for longer than a second predetermined interval or number of days, e.g., 60 days, and transmits a second reminder notification to the insurer 130 regarding any such delayed appeal over the communications network at step 3030. Each time a second reminder notification is sent to the insurer 130, the MCO process management module 300 notifies and provides a delivery confirmation of the second reminder notification to the healthcare provider 130 associated with the delayed appeal over the communications network at step 3030. In addition or alternatively, the MCO process management module 300 notifies the appeals coordinator of any such delayed appeal and the appeals coordinator contacts a chief nurse reviewer who can call the insurer's appeal supervisor to expedite the completion of such delayed appeals at step 3030. The MCO process management module 300 sends any response to an appeal received within the second predetermined interval to the appeals decision matrix module 400 at step 3040.

The MCO process management module 300 sends any response to an appeal received within a third predetermined interval or number of days, e.g., 90 days, to the appeals decision matrix module 400 at step 3060. The MCO process management module 300 uses the activity tracking system of the database to identify any appeal that have been with the insurer 130 for longer than the third predetermined interval, and transmits a third reminder notification to the insurer 130 regarding any such delayed appeal over the communications network at step 3050. Each time a third reminder notification is sent to the insurer 130, the MCO process management module 300 notifies and provides a delivery confirmation to the healthcare provider 130 associated with the delayed appeal over the communications network at step 3050. In addition or alternatively, the MCO process management module 300 notifies the appeals coordinator of any such delayed appeal and the appeals coordinator contacts a medical director who can call the insurer's medical director or other senior management personnel to expedite the completion of such delayed appeals at step 3050. It is appreciated that the first, second and third predetermined intervals can be set and/or adjusted based on individual insurer's requirements, regulations established by the state insurance regulators, and/or by the operator of the claimed system for managing appeal process, appellant or the healthcare provider 110. Although only three predetermined intervals are utilized by the claimed system, the claimed system can operate with any number of predetermined number of intervals, as few as one or more than three.

If a response to delayed appeal is finally received from the insurer 130, the MCO process management module 300 sends such received appeal to the appeals decision matrix module 400 at step 3070. However, if no response is received from the insurer 130 after transmitting the third reminder notification or contacting the insurer's medical director, then the MCO process management module 300 recommends that the medical director contact the state insurance regulators at step 3080.

Upon receipt of the appeals determination from the insurer 130, the appeals decision matrix module 400 enters the appeals determination and appeals timeliness information into the database and reviews the received appeals determination.

Figure 4:
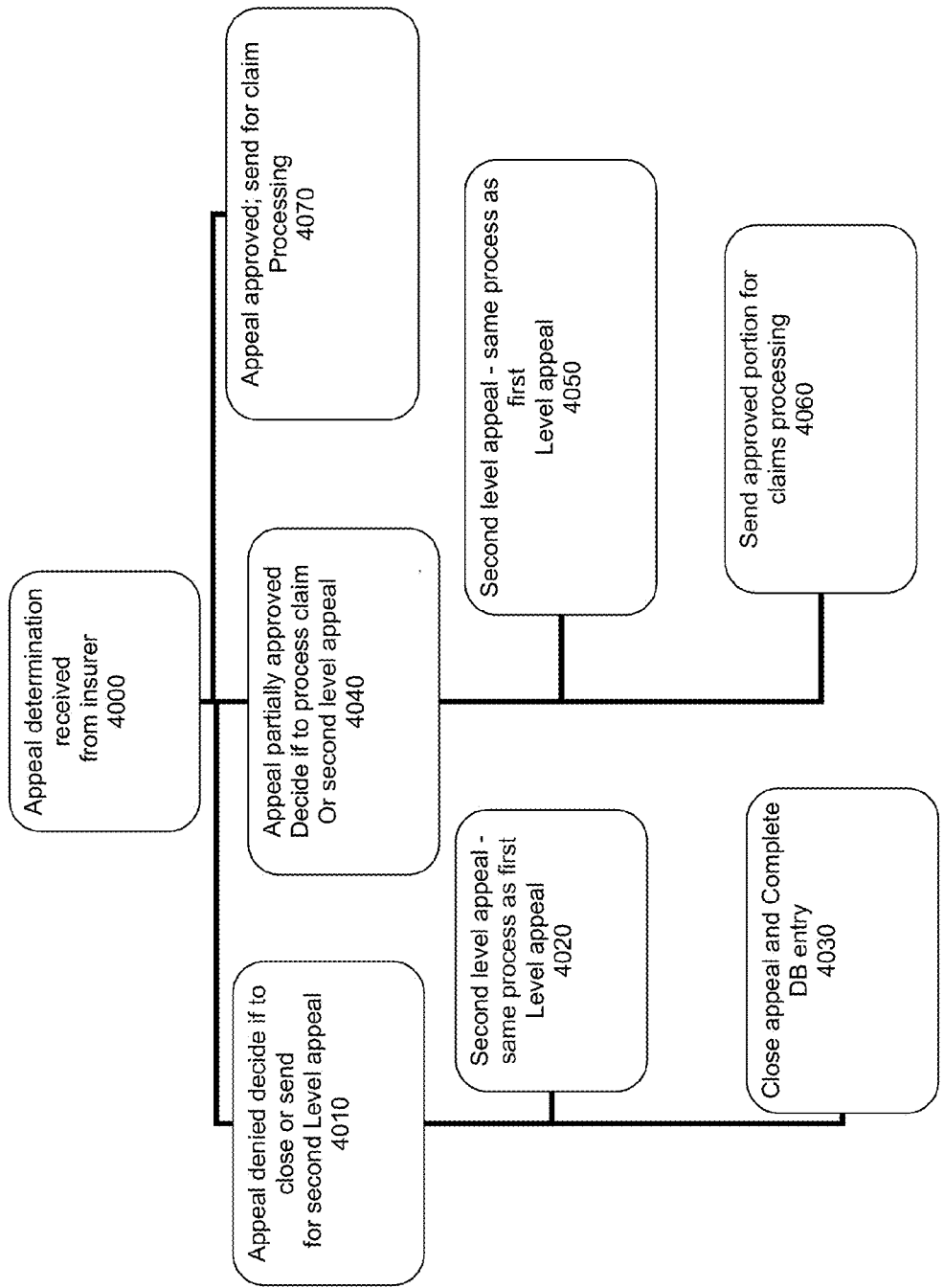
FIG. 4 illustrates the appeals decision matrix in accordance with an exemplary embodiment of the claimed invention.

In accordance with an exemplary embodiment of the claimed invention, the appeals decision matrix process is now described in conjunction with FIG. 4. Although only two levels of appeal is shown in FIG. 4, it is appreciated that the appeals decision matrix process can involve additional levels of appeal or different levels of appeal depending on insurer's requirements and procedures, and/or state insurance regulations. That is, for example, the appeals decision matrix process may use three levels of appeal for insurer A and use five levels of appeal for insurer B. The appeals decision matrix module 400 reviews the appeal determination in accordance with the appeals decision matrix comprising a plurality of variables, including but not limited to the identity of the insurer, insurer's requirements and procedures, claims processing history of the insurer, appeals determination, state regulations, etc. at step 4000. If appeal is denied, a decision is made either to accept the denial and close the appeal or complete a second level appeal to challenge the denial at step 4010. If the appeal is closed, the appeals decision matrix module 400 enters a closure date and the reason for closure into database 150 at step 4030. However, if a decision is made to proceed with a second level appeal, the appeals decision matrix module 400 initiates a process mirroring the initial appeal process at step 4020. Alternatively, if a decision is made to call the insurer 130, then the appeals decision matrix module 400 communicates the appeal information and reason for calling to medical director, who then makes the call to the insurer's medical director.

If the appeal is partially denied, a decision is made whether to accept the partial denial and proceed to claims payment, proceed with a second level appeal to challenge the appeal or call the insurer's medical director to challenge the appeal at step 4040. If partial denial of the appeal is accepted, then the appeals decision matrix module 400 moves the appeal to a claims payment decision matrix module 420 at step 4060. If the decision is made to proceed with a second level appeal, the appeal decision matrix module 400 sends the appeal to the appeals processing and submission process at step 4050, as described herein with steps 2000-2060. Alternatively, if a decision is made to call insurer's medical director, then appeal information and reason for calling are communicated to medical director, who then makes the call to the insurer's medical director. However, if appeal is approved, the approved appeal is moved to a claims payment decision matrix module 500 for processing at step 4070.

Figure 5:
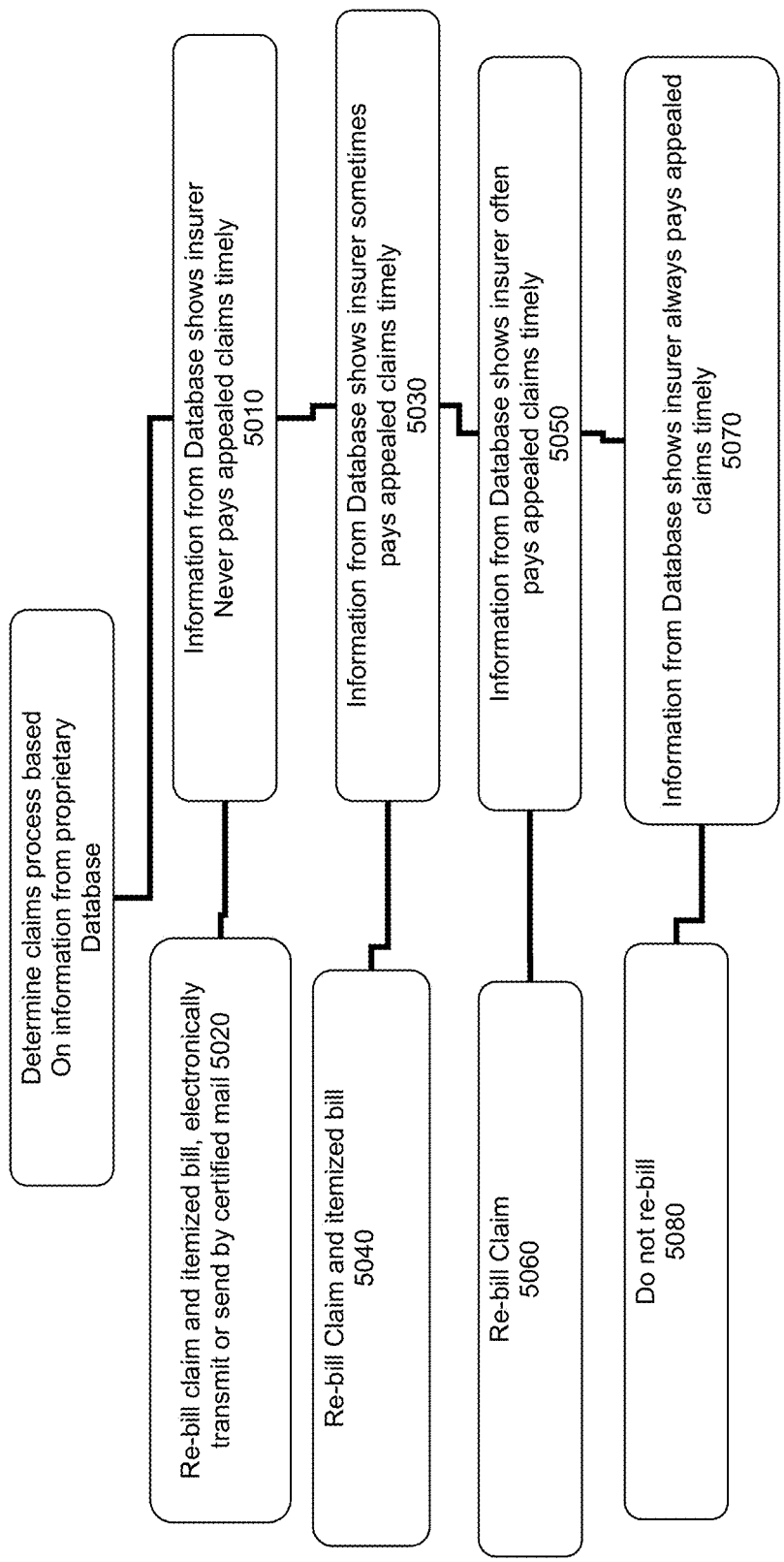
FIG. 5 illustrates the claims process determination matrix in accordance with an exemplary embodiment of the claimed invention.
Figure 6:
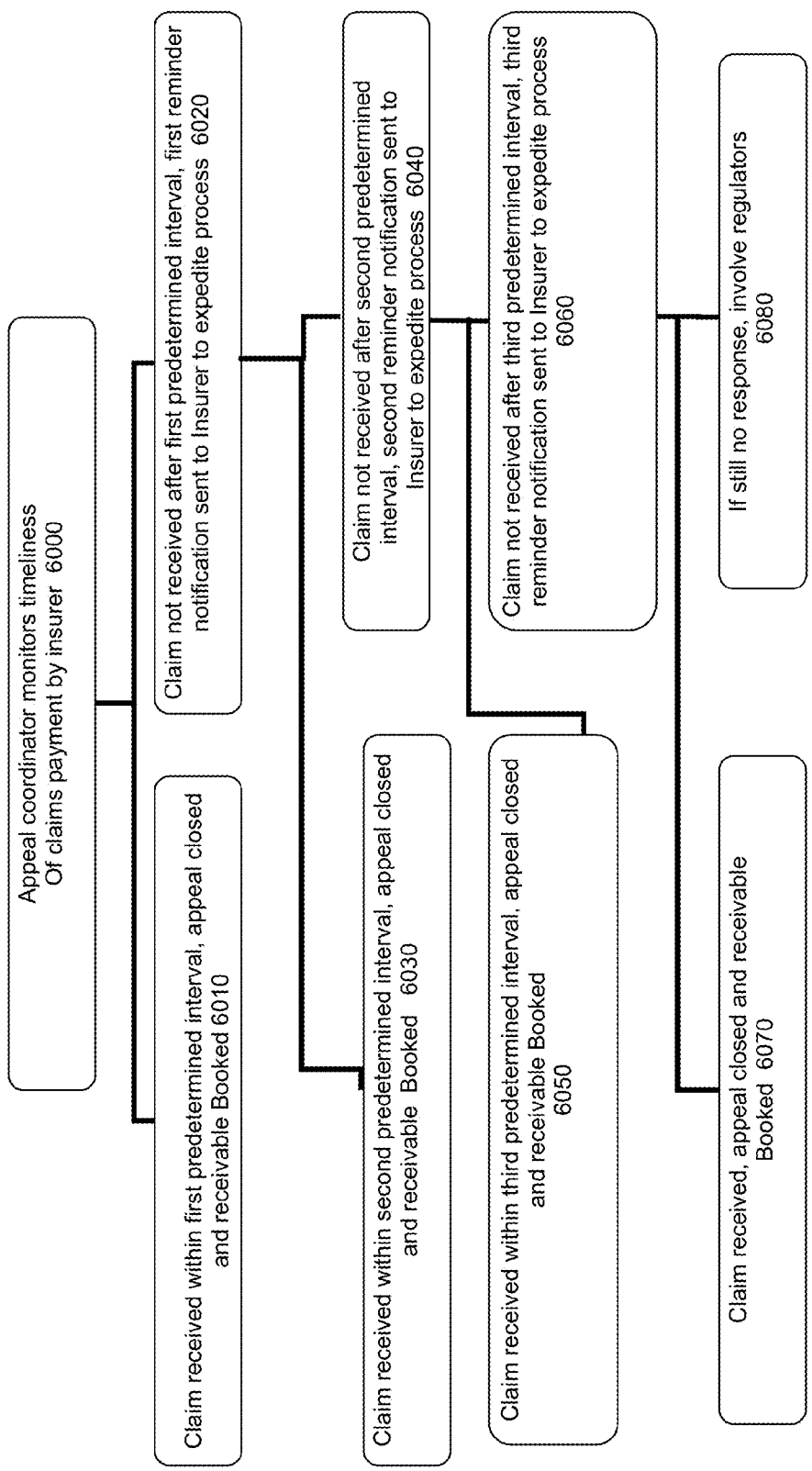
FIG. 6 illustrates the process for managing processing and payment of appeals in accordance with an exemplary embodiment of the claimed invention.

In accordance an exemplary embodiment of the claimed invention, the claims determination process and the process for managing processing and payment of appeals are described in conjunction with FIGS. 5 and 6. The claims payment decision matrix module 500 and claims payment management module 550 monitor the approved appeal to insure timely payment from the insurer 130 to the healthcare provider 110. The claims payment decision matrix module 500 and claims payment management module 550 ensure that the insurer 130 has a clean claim for each approved appeal, as well as tracking the timeliness of payment of each approved appeal. Most states have a 30 day claims payment rule that insurers must abide by.

In accordance with an exemplary embodiment of the claimed invention, the claims payment decision matrix module 500 processes the approved appeals and determines subsequent actions based on the stored information in the database, including but not limited to a past payment history of the insurer 130, the approved amount, insurer's regulatory entity, insurer's policies and procedures, and the timeliness of the claim processing and payment at step 5000. The claims payment decision matrix module 500 can take no action, or electronically transmit a clean universal billing (UB) form or a Center for Medicare and Medicaid Services (CMS) form, a clean UB form and an itemized bill, or a UB form and an itemized bill to the insurer 130 over the communications network. In addition or alternatively, the claims payment decision matrix module 500 can send a clean UB form or a CMS form, a clean UB form and an itemized bill, or a UB form and an itemized bill to the insurer 130 by certified mail. It is appreciated that electronic transmission of the forms include accessing the insurer's web-based system 130 to complete and submit the requisite forms and documents (e.g., an itemized bill) to the insurer. Further, the claims payment decision matrix module 500 transmits an electronic notification and proof of submission to the healthcare provider 110 over the communications network.

If the claims payment decision matrix module 500 determines that the insurer never pays the appealed claims timely at step 5010, then the claims payment decision matrix module 500 re-bills by preparing and electronically transmitting a clean UB form and an itemized bill to the insurer 130 over the communications network at step 5020. Also, the claims payment decision matrix module 500 transmits an electronic notification and proof of submission to the healthcare provider 110 over the communications network. In addition or alternatively, the claims payment decision matrix module 500 re-bills by preparing and sending a clean UB form and an itemized bill by certified mail to the insurer at step 5020.

However, if the inquiry at step 5010 is answered in the negative, then the claims payment decision matrix module 500 determines if the insurer 130 sometimes pays the appeal claims timely at step 5030. If the inquiry at step 5030 is answered in the affirmative, then the claims payment decision matrix module 500 re-bills by preparing and electronically transmitting a clean UB form and an itemized bill to the insurer 130 over the communications network at step 5040. Also, the claims payment decision matrix module 500 transmits an electronic notification and proof of submission to the healthcare provider 110 over the communications network. In addition or alternatively, the claims payment decision matrix module 500 re-bills by preparing and sending a clean UB form and an itemized bill by mail to the insurer at step 5040. However, if the inquiry at step 5030 is answered in the negative, then the claims payment decision matrix module 500 determines if the insurer 130 often pays the appeal claims timely at step 5050.

If the inquiry at step 5050 is answered in the affirmative, then the claims payment decision matrix module 500 re-bills by preparing and electronically transmitting clean UB form to the insurer 130 over the communications network at step 5060. Also, the claims payment decision matrix module 500 transmits an electronic notification and proof of submission to the healthcare provider 110 over the communications network. In addition or alternatively, the claims payment decision matrix module 500 re-bills by preparing and sending a clean UB form by mail to the insurer at step 5060. However, if the inquiry at step 5050 is answered in the negative, then the claims payment decision matrix module 500 determines if the insurer 130 always pays the appeal claims timely at step 5070. If the inquiry at step 5070 is answered in the affirmative, then the claims payment decision matrix module 500 does not re-bill the insurer 130 at step 5080. However, if the inquiry at step 5070 is answered in the negative, then these cases have already been addressed in steps 5000-5060 and the claims payment decision matrix module 500 does nothing.

Turning now to FIG. 6, in accordance with an exemplary embodiment of the claimed invention, the claims payment management module 550 monitors the timeliness of the appealed claim payment at step 6000. That is, the claims payment management module 550 utilizes activity tracking system of the database 150 to identify any appealed claims not paid within a first predetermined interval or number of days, e.g., 45 days, at step 6000.

If the inquiry at step 6000 is answered in the negative, the claims payment management module 550 closes the appeal and payment is recorded or booked at step 6010. However, if the inquiry at step 6000 is answered in the affirmative, the claims payment management module 550 transmits a first reminder notification to the insurer 130 regarding any such delayed payment over the communications network at step 6020. Also, the claims payment management module 550 confirms clean claim on file, approval on file and the payment date with the insurer 130, and provides any missing information to the insurer 130 over the communications network at step 6020. Each time a first reminder notification is sent to the insurer 130, the claims payment management module 550 notifies and provides a delivery confirmation of the first reminder notification to the healthcare provider 130 associated with the delayed payment over the communications network at step 6020. In addition or alternatively, the claims payment management module 550 notifies the appeal coordinator of any such delayed payment and the appeals coordinator can call the insurer 130 to expedite any such delayed payment, including but not limited to confirming clean claim on file, approval on file, payment date, and providing any missing information at step 6020.

If a claim is identified as being not paid within a second predetermined interval or number of days, e.g., 60 days, the claims payment management module 550 transmits a second reminder notification to the insurer 130 regarding any such delayed payment over the communications network at step 6040. Each time a second reminder notification is sent to the insurer 130, the claims payment management module 550 notifies and provides a delivery confirmation of the second reminder notification to the healthcare provider 130 associated with the delayed payment over the communications network at step 6040. In addition or alternatively, the claims payment management module 550 notifies the appeal coordinator of any such delayed payment and the appeals coordinator contacts the chief nurse reviewer or the head nurse at step 6040. The head nurse can call the insurer's appeal supervisor to expedite the payment. However, if a claim is identified as being paid within the second predetermined interval, the claims payment management module 500 closes the appeal and payment is recorded or booked at step 6030.

If a claim is identified as being not paid within a third predetermined interval or number of days, e.g., 90 days, the claims payment management module 550 transmits a third reminder notification to the insurer 130 regarding any such delayed payment over the communications network at step 6060. Each time a third reminder notification is sent to the insurer 130, the claims payment management module 550 notifies and provides a delivery confirmation of the second reminder notification to the healthcare provider 130 associated with the delayed payment over the communications network at step 6060. In addition or alternatively, the claims payment management module 550 notifies the appeal coordinator of any such delayed payment and the appeals coordinator contacts the medical director at step 6060. The medical director can call the insurer's medical director to expedite the payment. However, if a claim is identified as being paid within the third predetermined interval, the claims payment management module 550 closes the appeal and payment is recorded or booked at step 6050.

If a payment is finally received, the claims payment management module 550 closes the appeal and payment is recorded or booked at step 6070. However, if no payment is received from the insurer 130 after transmitting the third reminder notification and/or contacting the insurer's medical director, then the claims payment management module 550 recommends that the medical director contact the state insurance regulators at step 6080.

In accordance with an exemplary embodiment of the claimed invention, the claimed system and method aids healthcare providers in recovering on unpaid claims by significantly increasing the success rate of appeals for claims that are denied. The claimed system and method comprises a denial reduction program module 600 that enables the system provider and/or operator to develop a customized denial reduction program for healthcare providers on an individual basis, in order to reduce the number of denials received and reduce the appeals burden on the healthcare provider 110. The database 150 captures all information related to each denial received. By trending and analyzing this information stored in the database 150, the denial reduction program module 600 can develop a customized denial reduction program for individual healthcare providers based on the particular needs of the provider. The program is implemented with the healthcare provider and results are monitored with by the claimed invention.

In accordance with an exemplary embodiment of the claimed invention, the system administrator or operator, medical director and data analysts utilize the denial reduction program module 600 and the database 150 to develop and generate denial reports in conjunction with the healthcare provider, nurse reviewer and appeals coordinator at step 7000. The system administrator, system operator and/or medical director utilizes the denial reports to examine and analyze the denials by insurer, physician, denial type and/or diagnosis. The data is analyzed to identify key drivers of denial activity. System administrator or operator, medical director and/or healthcare provider's representatives reviews the data and strategies developed by the denial reduction program module 600 to decrease denials, which can be implemented and monitored by the system. It is appreciated that the system provider and/or healthcare provider provides focused education and seminar to healthcare provider's staff to successfully implement the program. The process feedback and improvement module 650 reviews and analyzes the denials by physician and diagnosis to determine potential intervention points to reduce such denials at step 7010. The medical director and healthcare provider representatives review the data and analysis and utilize the denial reduction program module 600 to develop and implement direct, indirect, prospective, concurrent and retroactive interventional programs to reduce the incidence of such denials at step 7020. The process feedback and improvement module 650 measures developed program results and provides feedback, e.g., reports, to the system administrator/operator, medical director and the healthcare provider 110 at step 7030.

In accordance with an exemplary embodiment of the claimed invention, the process feedback and improvement module 650 provides status and/or process reports to the healthcare provider 110 and/or the system administrator/operator. The process feedback and improvement module 650 can generate the status/process reports by the insurer or by the healthcare provider to assist in monitoring the efficiency of the appeal process. The status/process reports can include but is not limited to timeline reports to monitor the appeal timeliness by the healthcare provider and/or insurer, appeal success/overturn reports to monitor the success of the appeal process, denials appealed report to monitor the percentage of denials appeal by the healthcare provider and/or insurer, open appeals report to track pending appeals by the healthcare provider and/or insurer, closed appeal report to track closed appeals by healthcare provider and/or insurer, and appeal status report to track status of each appeal.

In accordance with an exemplary embodiment of the claimed invention, the denial reduction program module 600 reviews and analyzes the denials by service type and/or timeliness of service provided to determine potential intervention points and/or identify appeals process inefficiencies at step 7040. The medical director and healthcare provider representatives review the data and analysis and utilize the process feedback and improvement module 650 to identify appeals process inefficiencies in terms of dollars resulting from such denials and develop programs to improve process efficiencies at step 7050. The process feedback and improvement module 650 performs a cost benefit analysis of implementing such process improvement programs at step 7060.

In accordance with an exemplary embodiment of the claimed invention, the denial reduction program module 600 reviews administrative denials and performs root cause analysis on such denials at step 7070. The medical director and healthcare provider representatives review the data and analysis and utilize the denial reduction program module 600 to develop and implement programs/strategies to minimize administrative denials at step 7070.

Figure 7:
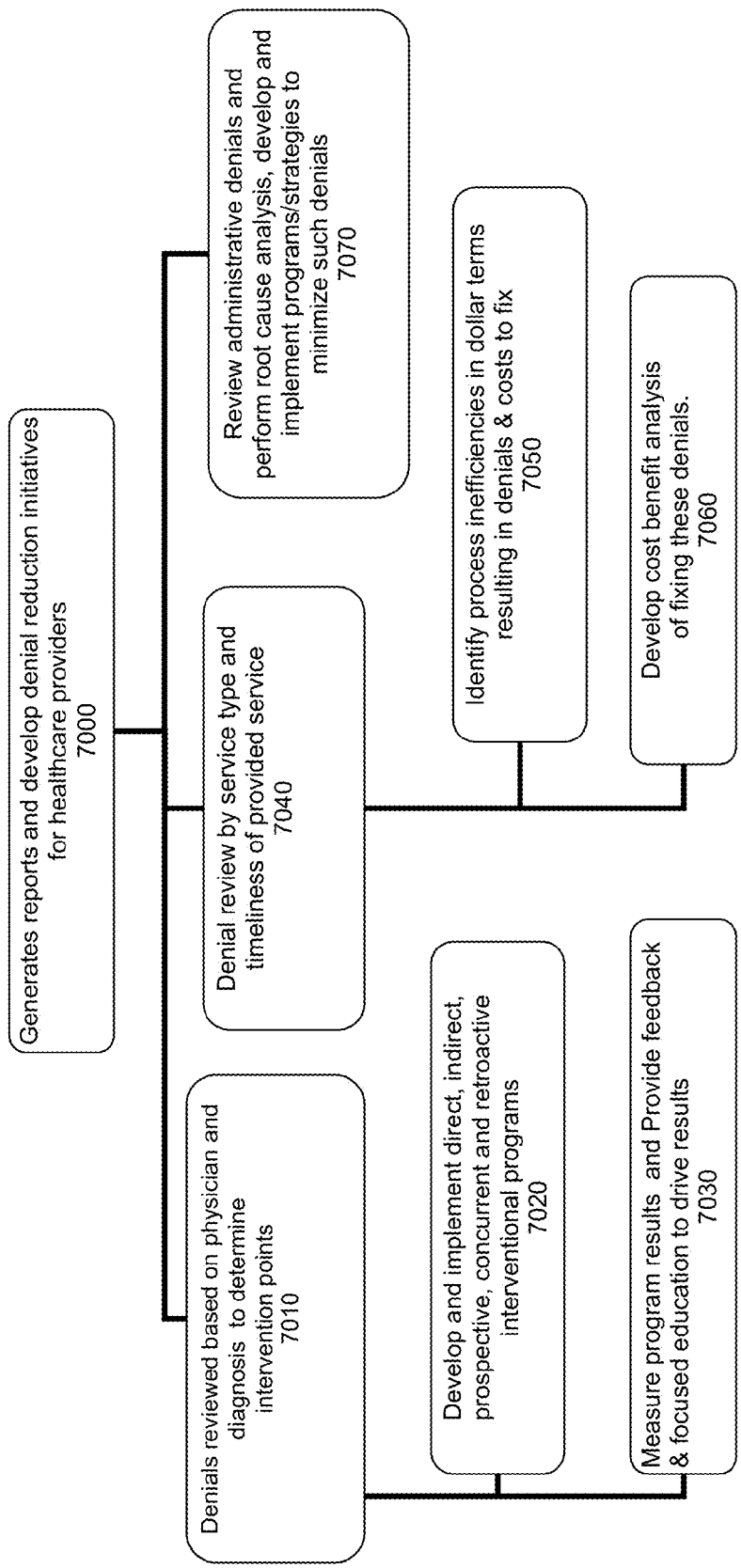
FIG. 7 illustrates the process for reducing denials in accordance with an exemplary embodiment of the claimed invention.
Figure 8:
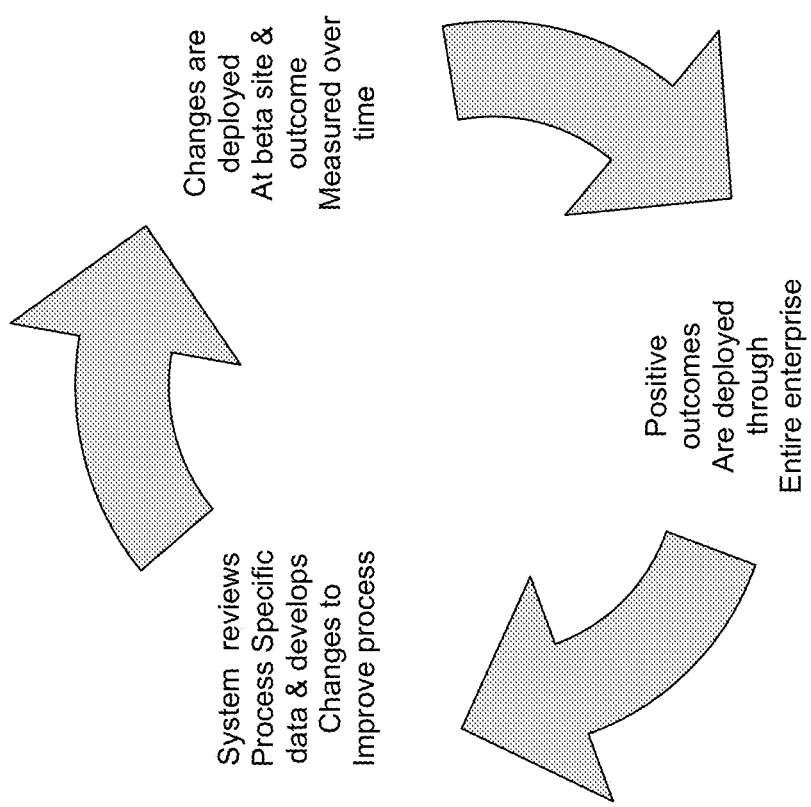
FIG. 8 illustrates the process for improving the appeals and claims processing in accordance with an exemplary embodiment of the claimed invention.

In accordance with an exemplary embodiment of the claimed invention, FIG. 8 illustrates the process of managing appeals by the inventive system and method. The system and method identifies appeals process inefficiencies and intervention points to reduce potential denials as depicted in FIG. 7. The system reviews process specific data and develops changes to improve the appeals process. The changes are then deployed at best site and the outcomes are measured over time. Those changes with positive outcomes are then deployed through the entire enterprise.

Although the claimed invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described herein. As one of ordinary skill in the art will readily appreciate from the disclosure of the claimed invention, processes, machines, manufacture, compositions of matter, means, methods, or steps, presently existing or later to be developed that perform substantially the same function or achieve substantially the same result as the corresponding embodiments described herein may be utilized according to the claimed invention. Accordingly, the appended claims are intended to include within their scope such processes, machines, manufacture, compositions of matter, means, methods, or steps.

The invention claimed is:

1. A web-based method for managing insurance claim denials for a plurality of healthcare providers, comprising the steps of:
    comparing a claim denial of a healthcare provider to a denial status grid comprising a list of denial types and an appeal success rate for each denial type on the list by a review module of a hardware server, wherein the review module provides a recommendation to proceed with or to decline to proceed with an appeal of the claim denial based on the comparison and a patient record associated with the claim denial;
    determining to proceed with the appeal of the claim denial based on the recommendation;
    preparing an appeals package comprising an appeals overturn letter and a supporting document in support of the appeal to the claim denial by the review module of the server;
    electronically submitting the appeals package to an insurer associated with the claim denial by an appeals coordinating module of the server over a communications network to file the appeal to the claim denial;
    monitoring the progress of the appeal filed with the insurer by a process management module of the server;
    processing an appeal determination electronically received from the insurer; and
    determining by an appeals decision matrix module of the server to file a second level appeal when the appeal is denied or partially denied.

2. The method of claim 1, wherein the step of monitoring further comprises the steps of electronically transmitting a reminder notification to a processor-based device of the insurer associated with the appeal over the communications network by the process management module of the server for the appeal determination not received within a predetermined interval from the insurer; and electronically transmitting a delivery confirmation of the reminder notification to a processor-based device of the healthcare provider associated with the appeal over the communications network by the process management module of the server.

3. The method of claim 2, further comprising the step of adjusting the predetermined interval associated with the appeal by the process management module of the server in response to an input from the healthcare provider associated with the appeal.

4. The method of claim 2, further comprising the step of adjusting the predetermined interval associated with the appeal by process management module of the server based on the requirements of the insurer associated with the appeal.

5. The method of claim 1, further comprising the step of determining a number of levels of appeal to file by the appeals decision matrix module of the server based on the insurer associated with the appeal when the appeal is denied or partially denied.

6. The method of claim 1, further comprises the steps of electronically transmitting a reminder notification to a processor-based device of the insurer associated with an approved appeal over the communications network by a claims payment management module of the server for the approved appeal not paid by the insurer within a predetermined interval; and electronically transmitting a delivery confirmation of the reminder notification to a processor-based device of the healthcare provider associated with the approved appeal over the communications network by the claims management module of the server.

7. The method of claim 1, further comprising the step of generating a process report for each insurer or each healthcare provider to assist in monitoring the efficiency of the appeal process by a process feedback and improvement module of the server.

8. A non-transitory computer readable medium comprising computer executable code for managing insurance claim denials for a plurality of healthcare providers, the computer executable code comprising instructions for:
   comparing a claim denial of a healthcare provider to a denial status grid comprising a list of denial types and an appeal success rate for each denial type on the list by a review module of a processor-based server, wherein the review module provides a recommendation to proceed with or to decline to proceed with an appeal of the claim denial based on the comparison and a patient record associated with the claim denial;
   determining to proceed with the appeal of the claim denial based on the recommendation;
   preparing an appeals package comprising an appeals overturn letter and a supporting document in support of the appeal to the claim denial by the review module of the server;
   electronically submitting the appeals package to an insurer associated with the claim denial by an appeals coordinating module of the server over a communications network to file the appeal to the claim denial;
   monitoring the progress of the appeal filed with the insurer by a process management module of the server;
   processing an appeal determination electronically received from the insurer; and
   determining by an appeals decision matrix module of the server to file a second level appeal when the appeal is denied or partially denied.

9. The computer readable medium of claim 8, wherein the computer executable code further comprises instructions for electronically transmitting a reminder notification to a processor-based device of the insurer associated with the appeal over the communications network by the process management module of the server for the appeal determination not received within a predetermined interval from the insurer; and electronically transmitting a delivery confirmation of the reminder notification to a processor-based device of the healthcare provider associated with the appeal over the communications network by the process management module of the server.

10. The computer readable medium of claim 9, wherein the computer executable code further comprises instructions for adjusting the predetermined interval associated with the appeal by the process management module of the server in response to an input from the healthcare provider associated with the appeal.

11. The computer readable medium of claim 9, wherein the computer executable code further comprises instructions for adjusting the predetermined interval associated with the appeal by process management module of the server based on the requirements of the insurer associated with the appeal.

12. The computer readable medium of claim 8, wherein the computer executable code further comprises instructions for determining a number of levels of appeal to file by the appeals decision matrix module of the server based on the insurer associated with the appeal when the appeal is denied or partially denied.

13. The computer readable medium of claim 8, wherein the computer executable code further comprises instructions for electronically transmitting a reminder notification to a processor-based device of the insurer associated with an approved appeal over the communications network by a claims payment management module of the server for the approved appeal not paid by the insurer within a predetermined interval; and electronically transmitting a delivery confirmation of the reminder notification to a processor-based device of the healthcare provider associated with the approved appeal over the communications network by the claims management module of the server.

14. A web-based computer system for managing insurance claim denials over a communications network, comprising:
   a hardware server for managing claim denials for a plurality of healthcare providers and comprising:
      a review module for comparing a claim denial of a healthcare provider to a denial status grid comprising a list of denial types and an appeal success rate for each denial type on the list, providing a recommendation to proceed with or to decline with an appeal of the claim denial based on the comparison and a patient record associated with the claim denial, wherein a determination to proceed with the appeal of the claim denial is based on the recommendation, preparing an appeals package comprising an appeals overturn letter and a supporting document in support of the appeal to the claim denial;
      an appeals coordinating module for electronically submitting the appeals package to an insurer associated with the claim denial over the communications network to file the appeal of the claim denial;
      a process management module for monitoring the progress of the appeal filed with the insurer; and an appeal decision matrix module for processing appeal determination electronically received from the insurer and determining whether to file a second level appeal when the appeal is denied or partially denied;

a database for storing the claim denial, the patient medical record, the appeals package and the appeal determination; and a plurality of processor-based devices to access the server over the communications network, each client device associated with a health care provider.

15. The computer system of claim 14, wherein the process management module electronically transmits a reminder notification to a processor-based device of the insurer associated with the appeal over the communications network for the appeal determination not received within a predetermined interval from the insurer; and electronically transmits a delivery confirmation of the reminder notification to a processor-based device of the healthcare provider associated with the appeal over the communications network.

16. The computer system of claim 15, wherein the process management module adjusts the predetermined interval associated with the appeal in response to an input received from the processor-based device of the healthcare provider associated with the appeal.

17. The computer system of claim 15, wherein the process management module adjusts the predetermined interval associated with the appeal based on the requirements of the insurer associated with the appeal.

18. The computer system of claim 14, wherein the appeals decision matrix module determines a number of levels of appeal to file based on the insurer associated with the appeal when the appeal is denied or partially denied.

19. The computer system of claim 14, wherein the server further comprises a claims payment management module for electronically transmitting a reminder notification to a processor-based device of the insurer associated with an approved appeal over the communications network for the approved appeal not paid by the insurer within a predetermined interval, and for electronically transmitting a delivery confirmation of the reminder notification to a processor-based device of the healthcare provider associated with the approved appeal over the communications network.

20. The computer system of claim 14, when the server further comprises a process feedback and improvement module for generating a process report for each insurer or for each healthcare provider to assist in monitoring the efficiency of the appeal process.

\* \* \* \* \*